(12) United States Patent
Ishihara et al.

(10) Patent No.: US 9,093,114 B2
(45) Date of Patent: Jul. 28, 2015

(54) METHOD FOR IDENTIFYING HIGH-SPEED FREQUENCY RESPONSE OF MULTIRATE SYSTEM AND APPARATUS THEREFOR

(75) Inventors: Yoshiyuki Ishihara, Kawasaki (JP); Shinji Takakura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 807 days.

(21) Appl. No.: 13/418,460

(22) Filed: Mar. 13, 2012

(65) Prior Publication Data
US 2013/0030743 A1    Jan. 31, 2013

(30) Foreign Application Priority Data
Jul. 27, 2011    (JP) .................... 2011-164061

(51) Int. Cl.
*G11B 20/00* (2006.01)
*G11B 20/10* (2006.01)
*G11B 5/55* (2006.01)

(52) U.S. Cl.
CPC ........ *G11B 20/10009* (2013.01); *G11B 5/5521* (2013.01)

(58) Field of Classification Search
CPC ............... G11B 5/5521; G11B 19/048; G11B 20/10009; G11B 20/100037; G11B 20/10046
USPC ......................................... 375/263; 369/53.1
See application file for complete search history.

(56) References Cited

U.S. PATENT DOCUMENTS 5,721,648 A * 2/1998 Phan et al. ................. 360/78.09
7,463,172 B2   12/2008 Toraichi et al.
2001/0006438 A1  7/2001 Nakagawa et al.
2003/0090275 A1* 5/2003 Ioannou ....................... 324/615
2010/0054098 A1  3/2010 Dunn

FOREIGN PATENT DOCUMENTS

CN         1926768         3/2007
JP        2006-195543      7/2006

OTHER PUBLICATIONS

Ding, et al. Identification of dual-rate systems based on finite impulse response models, International Journal of Adaptive Control and Signal Processing, 18-7, pp. 589-598, 2004.
Office Action for Chinese Patent Application No. 201210068435.0 Dated Sep. 10, 2014, 5 pages.

* cited by examiner

*Primary Examiner* — David B Lugo
(74) *Attorney, Agent, or Firm* — Amin, Turocy & Watson, LLP (57) ABSTRACT

There is provided with a method of identifying a frequency response of a controlled object at a sampling period of control input in a multiplexed-input multirate system in which a sampling period of control output is even "P" multiples of the sampling period of control input wherein the control object is represented by FIR filter, an M-series signal corresponding to an acquisition data length Mp×P−1 is generated, the Mp indicates a period of the M-series signal, an impulse response value of the controlled object is estimated based on the M-series signal and output data outputted from the controlled object by inputting the M-series signal thereto, and the frequency response of the controlled object is identified by performing a discrete Fourier transform on the impulse response value.

4 Claims, 6 Drawing Sheets

| | period 1 | | | | | | | period 2 | | | | | | |
|---|---|---|---|---|---|---|---|---|---|---|---|---|---|---|
| input | u[0] | u[1] | u[2] | u[3] | u[4] | u[5] | u[6] | u[0] | u[1] | u[2] | u[3] | u[4] | u[5] | u[6] |
| output | y[0] | 0 | y[2] | 0 | y[4] | 0 | y[6] | 0 | y[8] | 0 | y[10] | 0 | u[12] | 0 |

Data Length (L = MpP−1)

ACQUISITION DATA LENGHT "L" (WHEN P = 2, Mp = 7)

RESULT OF FREQUENCY RESPONSE IDENTIFICATION
WHEN MATHEMATICAL EXPRESSION (15) IS NOT SATISFIED

FIG. 6

METHOD FOR IDENTIFYING HIGH-SPEED FREQUENCY RESPONSE OF MULTIRATE SYSTEM AND APPARATUS THEREFOR

CROSS REFERENCE TO RELATED APPLICATIONS

This application is based upon and claims the benefit of priority from the prior Japanese Patent Application No. 2011-164061, filed on Jul. 27, 2011, the entire contents of which are incorporated herein by reference.

FIELD

Embodiments relate to a method of identifying high-speed frequency response of a multirate system and an apparatus therefore. For example, the embodiments relate to an algorithm for rapidly identifying the frequency response of a controlled object at a sampling period of control input side in a multiplexed-input multirate system in which sampling period of control output is even multiples of the sampling period of control input.

BACKGROUND

In a multiplexed-input multirate system used in a head positioning control system for a magnetic disk device or the like, it may in some cases be necessary to identify the frequency response (transfer function) of a controlled object at a sampling period of a control input side at the time of control system design. Since control output (observed output) is thinned out (down-sampled) in the multiplexed-input multirate system, a usual method of frequency response identification cannot be directly applied. Accordingly, there arises the need for an identification algorithm that takes into consideration features of the multiplexed-input multirate system.

DETAILED DESCRIPTION

There is provided with a method of identifying a frequency response of a controlled object at a sampling period of control input in a multiplexed-input multirate system in which a sampling period of control output is even "P" multiples of the sampling period of control input.

An M-series signal corresponding to an acquisition data length Mp×P−1 is generated. The M-series signal is a type of pseudo white signal and the Mp indicates a period of the M-series signal.

An impulse response value of the controlled object is estimated based on output data outputted from the controlled object by inputting the M-series signal thereto and the M-series signal.

A discrete Fourier transform is performed on the impulse response value and the frequency response of the controlled object is identified.

Hereinafter, the embodiment will be described in more detail.

An identification algorithm according to an embodiment uses an M-series signal which is a type of pseudo white signal as an input for identification and an FIR (Finite Impulse Response) model as a model for identification. In addition, a multirate ratio is required to be even "P" multiples, i.e., the sampling period of control output is required to be twice, four times, six times, ... the sampling period of control input.

Here, the transfer function of the multiplexed-input multirate system is known to be given by Mathematical Expression (1) shown below:

$$Y(z) = \frac{1}{P}\sum_{n=0}^{P-1} G_0(z\phi^n) \cdot U(z\phi^n), \phi = \exp\left(j\frac{2\pi}{P}\right) \quad (1)$$

In Mathematical Expression (1), "Y(z)" denotes an output transfer function, "U(z)" denotes an input transfer function, "$G_0(z)$" denotes the transfer function of a controlled object at an input-side sampling period, and "P" denotes a multirate ratio. The transfer function of a controlled object to be identified in the present embodiment is "$G_0(z)$" in Mathematical Expression (1). If, for example, the multirate ratio P=2, then Mathematical Expression (1) is $$Y(z) = \frac{1}{2}G_0(z)U(z) + \frac{1}{2}G_0(-z)U(-z) \quad (2)$$

Hereinafter, the identification algorithm of the present embodiment will be described assuming that multirate ratio P=2 is used.

First, in the present embodiment, the model for identification "$\hat{G}_0(z)$" corresponding to "$G_0(z)$" is defined as the FIR model of Mathematical Expression (3) shown below using unknown parameters $\hat{b}_0, \hat{b}_1, \hat{b}_2, \ldots, \hat{b}_n$.

$$\hat{G}_0(z)=\hat{b}_0+\hat{b}_1 z^{-1}+\hat{b}_2 z^{-2}+\ldots+\hat{b}_n z^{-n} \quad (3)$$

If an input time series is u[0], u[1], ..., u[m], then "U(z)" in Mathematical Expression (2) can be represented by the FIR model of Mathematical Expression (4) shown below, as in Mathematical Expression (3):

$$U(z)=u[0]+u[1]z^{-1}+u[2]z^{-2}+\ldots+u[m]z^{-m} \quad (4)$$

In addition, $$\hat{G}_0(-z)=\hat{b}_0-\hat{b}_1 z^{-1}+\hat{b}_2 z^{-2}-\ldots+(-1)^n \hat{b}_n z^{-n}$$

$$U(-z)=u[0]-u[1]z^{-1}+u[2]z^{-2}-\ldots+(-1)^m u[m]z^{-m} \quad (5)$$

Here, output when "$\hat{G}_0(z)$" is substituted for "$G_0(z)$" in Mathematical Expression (2), i.e., the time series $\hat{y}[k]$ of a model output at respective time points k=0, 1, 2, ..., can be calculated by means of simple convolution from Mathematical Expressions (3) to (5), as shown below:

(If $k = 0$)

$$\hat{y}[0] = \frac{1}{2}[\hat{b}_0 \ \hat{b}_1 \ \hat{b}_2 \ ... \ \hat{b}_n] \cdot [u[0] \ 0 \ 0 \ 0 \ 0 \ ... \ 0]^T +$$
$$\frac{1}{2}[\hat{b}_0 \ -\hat{b}_1 \ \hat{b}_2 \ ... \ (-1)^n \hat{b}_n] \cdot [u[0] \ 0 \ 0 \ 0 \ 0 \ ... \ 0]^T$$
$$= \hat{b}_0 u[0]$$

(If $k = 1$)

$$\hat{y}[1] = \frac{1}{2}[\hat{b}_0 \ \hat{b}_1 \ \hat{b}_2 \ ... \ \hat{b}_n] \cdot [u[1] \ u[0] \ 0 \ 0 \ 0 \ ... \ 0]^T +$$
$$\frac{1}{2}[\hat{b}_0 \ -\hat{b}_1 \ \hat{b}_2 \ ... \ (-1)^n \hat{b}_n] \cdot [-u[1] \ u[0] \ 0 \ 0 \ 0 \ ... \ 0]^T$$
$$= 0$$

(If $k = 2$)

$$\hat{y}[2] = \frac{1}{2}[\hat{b}_0 \ \hat{b}_1 \ \hat{b}_2 \ ... \ \hat{b}_n] \cdot [u[2] \ u[1] \ u[0] \ 0 \ 0 \ 0 \ ... \ 0]^T +$$
$$\frac{1}{2}[\hat{b}_0 \ -\hat{b}_1 \ \hat{b}_2 \ ... \ (-1)^n \hat{b}_n] \cdot$$
$$[u[2] \ -u[1] \ u[0] \ 0 \ 0 \ 0 \ ... \ 0]^T$$
$$= \hat{b}_0 u[2] + \hat{b}_1 u[1] + \hat{b}_2 u[0]$$

(If $k = 3$)

$$\hat{y}[3] = \frac{1}{2}[\hat{b}_0 \ \hat{b}_1 \ \hat{b}_2 \ ... \ \hat{b}_n] \cdot [u[3] \ u[2] \ u[1] \ u[0] \ 0 \ 0 \ ... \ 0]^T +$$
$$\frac{1}{2}[\hat{b}_0 \ -\hat{b}_1 \ \hat{b}_2 \ ... \ (-1)^n \hat{b}_n] \cdot$$
$$[-u[3] \ u[2] \ -u[1] \ u[0] \ 0 \ 0 \ ... \ 0]^T$$
$$= 0$$

(If $k = 4$)

$$\hat{y}[4] = \frac{1}{2}[\hat{b}_0 \ \hat{b}_1 \ \hat{b}_2 \ ... \ \hat{b}_n] \cdot [u[4] \ u[3] \ u[2] \ u[1] \ u[0] \ 0 \ ... \ 0]^T +$$
$$\frac{1}{2}[\hat{b}_0 \ -\hat{b}_1 \ \hat{b}_2 \ ... \ (-1)^n \hat{b}_n] \cdot$$
$$[u[4] \ -u[3] \ u[2] \ -u[1] \ u[0] \ 0 \ ... \ 0]^T$$
$$= \hat{b}_0 u[4] + \hat{b}_1 u[3] + \hat{b}_2 u[2] + \hat{b}_3 u[1] + \hat{b}_4 u[0]$$

(The same applies hereinafter.)

From the foregoing, it is understood that if "k" is an odd number, the time series "ŷ[k]" of the model output results in responses in which output is thinned out (down-sampled).

In order to estimate the unknown parameters $\hat{b}_0$, $\hat{b}_1$, $\hat{b}_2$, ..., $\hat{b}_n$ of the identified model "$\hat{G}_0(z)$", a problem of minimizing the square sum of an error "e[k]" (least-square method) between the time series "y[k]" of output when input signals u[0], u[1], u[m] are applied to actual hardware (for example, a head positioning control system for magnetic disk units) and the time series "ŷ[k]" of the model output has only to be solved. In a multiplexed-input multirate system where multirate ratio P=2, both "y[k]" and "ŷ[k]" are thinned out into 0 if "k" is an odd number. Thus, "e[k]" (k=0, 1, 2, ...) is given by Mathematical Expression (6) shown below:

$$e[0] = y[0] - \hat{y}[0] = y[0] - \hat{b}_0 u[0] \qquad (6)$$
$$e[1] = y[1] - \hat{y}[1] = 0$$
$$e[2] = y[2] - \hat{y}[2] = y[2] - (\hat{b}_0 u[2] + \hat{b}_1 u[1] + \hat{b}_0 u[0])$$

-continued
$$e[3] = y[3] - \hat{y}[3] = 0$$
$$e[4] = y[4] - \hat{y}[4]$$
$$= y[4] - (\hat{b}_0 u[4] + \hat{b}_1 u[3] + \hat{b}_2 u[2] + \hat{b}_3 u[1] + \hat{b}_4 u[0])$$
$$\vdots$$

Accordingly, the least-square method to be solved is $$\sum_{l=0}^{N} e[2l]^2 \to \min \qquad (7)$$

The solution of Mathematical Expression (7) is found using vectors represented by Mathematical Expression (8) shown below, the vectors being composed of the unknown parameters $\hat{G}_0$, $\hat{G}_1$, $\hat{G}_2$, ..., $\hat{G}_n$ and inputs u[0], u[1], u[2], ..., respectively:

$$\hat{\theta} = [\hat{b}_0 \hat{b}_1 \hat{b}_2 ... \hat{b}_n]^T$$
$$u[k] = [u[k] u[k-1] u[k-2] ... u[k-n]]^T \qquad (8)$$

Thus, the solution is given by Mathematical Expression (9) shown below:

$$\hat{\theta} = \left(\sum_{l=0}^{N} u[2l]u[2l]^T\right)^{-1} \left(\sum_{l=0}^{N} u[2l]y[2l]^T\right) \qquad (9)$$

Next, consider that Mathematical Expression (9) is actually calculated. In the present embodiment, an M-series which is a type of pseudo white signal is used for "u[k]". Accordingly, if a summation frequency "N" in Mathematical Expression (9) is selected as $$N = M_p - 1 \qquad (10)$$

according to a period "Mp" of the M-series, then the first term $$\Lambda = \sum_{l=0}^{N} u[2l]u[2l]^T \qquad (11)$$

within the parentheses on the right-hand side of Mathematical Expression (9) is represented as $$\Lambda = u[0]u[0]^T + u[2]u[2]^T + ... + u[2(M_p - 2)]u[2(M_p - 2)]^T u[2(M_p - 1)]u[2(M_p - 1)]^T \qquad (12)$$

Here, Mathematical Expression (12) can be transformed into $$\Lambda = u[0]u[0]^T + u[2]u[2]^T + ... + u[M_p - 1]u[M_p - 1]^T + \qquad (13)$$
$$u[1]u[1]^T + u[3]u[3]^T + ... + u[M_p - 2]u[M_p - 2]^T$$
$$= \sum_{l=0}^{M_p - 1} u[l]u[l]^T$$

if the periodicity of the M-series is taken into consideration. Thus, it is understood that the mathematical expression is an autocorrelation matrix corresponding to one period of the M-series. Accordingly, from the nature of the autocorrelation of a white signal, the off-diagonal terms of Mathematical Expression (13) can be approximately set to 0, as in Mathematical Expression (14) shown below:

$$\Lambda \cong \begin{bmatrix} \sigma_u^2 & 0 & \cdots & 0 \\ 0 & \sigma_u^2 & \ddots & \vdots \\ \vdots & \ddots & \ddots & 0 \\ 0 & \cdots & 0 & \sigma_u^2 \end{bmatrix} \quad (14)$$

"$\sigma_u^2$" in Mathematical Expression (14) is the variance of u[k]. Therefore, an inverse matrix operation of the right-hand side of Mathematical Expression (9) can be replaced by a simple division. Thus, it is possible to greatly reduce computational load. That is, there is no need to perform inverse matrix operations requiring large computational load. In order for Mathematical Expression (14) to be satisfied, the minimum necessary acquisition data length "L" at the time of identification experiment is $$L = M_p P - 1 \quad (15)$$

Figure 1:
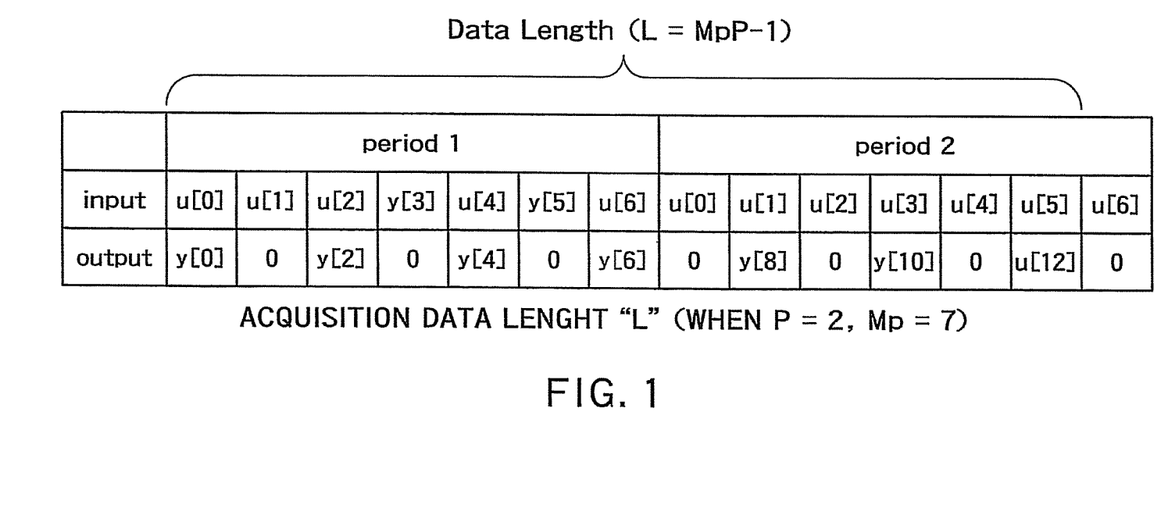
FIG. 1 is a drawing showing an acquisition data length "L" in an identification algorithm according to an embodiment.

FIG. 1 illustrates a concept of acquisition data lengths at the time of identification experiment. In FIG. 1, acquisition data lengths when multirate ratio P=2 and the period "Mp" of the M-series is Mp=7 are shown.

From the foregoing, the unknown parameter estimating algorithm when multirate ratio P=2 is $$\hat{\theta} = \frac{\left( \sum_{l=0}^{M_p-1} u[2l] y[2l] \right)}{\sigma_u^2} \quad (16)$$

In the case of a general even-multiple multirate ratio (P=2, 4, 6, ...), the unknown parameter estimating algorithm is $$\hat{\theta} = \frac{\left( \sum_{l=0}^{M_p-1} u[Pl] y[Pl] \right)}{\sigma_u^2} \quad (17)$$

Mathematical Expressions (15) and (17) shown above are basic algorithms in the present embodiment. In addition, "$\hat{\theta}$" calculated based on Mathematical Expression (17) is the estimated impulse response value (numerator polynomial coefficient of the FIR model) of "$G_0(z)$". Consequently, the frequency response of "$G_0(z)$" can be determined by performing the discrete Fourier transform of "$\hat{\theta}$". The discrete Fourier transform can be easily performed using an FFT (Fast Fourier Transform).

In the above-described algorithms of the present embodiment, an input signal for identification is defined as an M-series signal. It is therefore generally possible to shorten a period of time taken for identification experiment, compared with a sine-wave sweep method or the like. In addition, Mathematical Expression (17) is composed of simple additions, multiplications and divisions. Accordingly, the mathematical expression can be implemented by using simple descriptions in a microprocessor to be mounted on hardware to which the present embodiment is applied or in an external computer.

Figure 2:
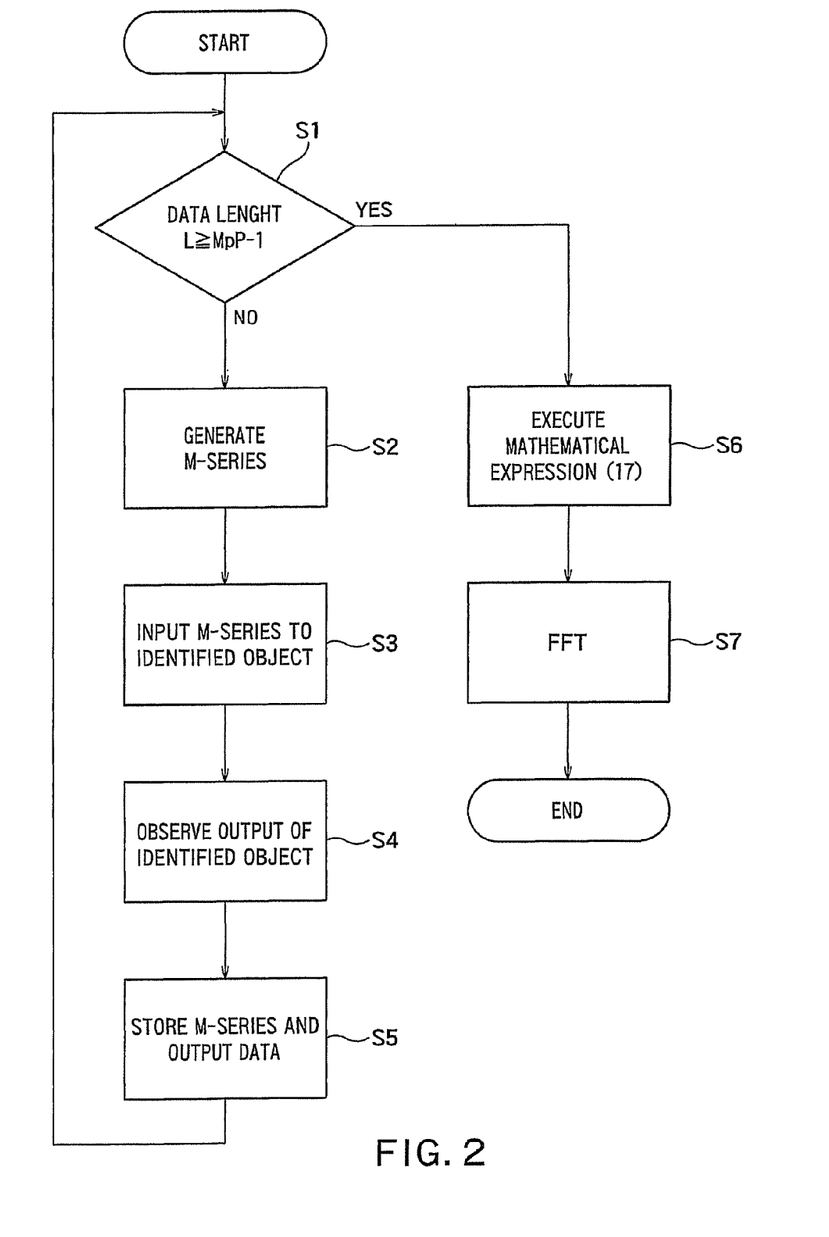
FIG. 2 is a flowchart illustrating the execution procedure of the embodiment.

A flowchart showing an execution procedure of the present embodiment is illustrated in FIG. 2. Processing according to this execution procedure is executed by the microprocessor mounted on hardware or the external computer.

In step S1, a determination is made whether the acquisition data length "L" has reached Mp×P−1.

If the data length "L" has not yet reached Mp×P−1, an M-series signal for the next time point is generated (S2), and the M-series signal is input to the identified object (ex. a magnetic disk device) (S3). Note that an M-series signal generation algorithm is given previously.

The output of the controlled object (identified object) is observed (S4), the M-series and the output data are stored in a storage unit, such as an internal memory or an external storage device (S5). Steps S1 to S4 described above are repeated until the data length "L" reaches Mp×P−1.

If the data length "L" has reached Mp×P−1, i.e., if signals and output data corresponding to the data length "L" have been acquired, the estimated impulse response value of the controlled object is calculated. Specifically, the estimated impulse response value "$\hat{\theta}$" of the FIR model which is the identified model of the controlled object is calculated according to Mathematical Expression (17) (S6). Then, the discrete Fourier transform of "$\hat{\theta}$" is performed (S7). The result of the discrete Fourier transform is the frequency response of the identified object to be determined.

Figure 6:
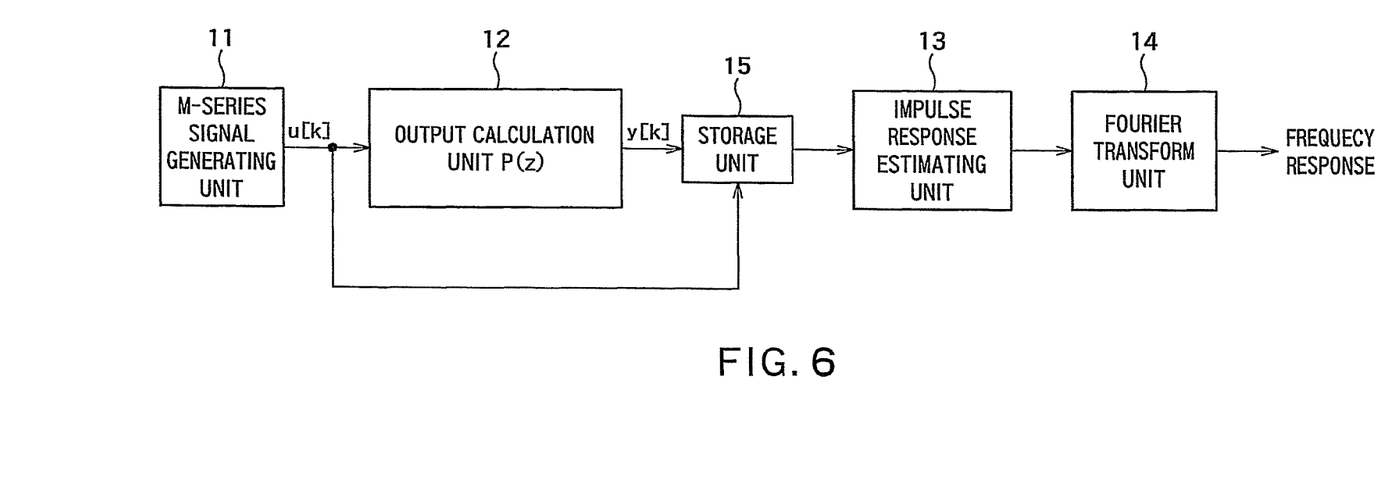
FIG. 6 is a functional block diagram of an apparatus according to the embodiment.

FIG. 6 illustrates a functional block diagram of an apparatus according to the present embodiment.

An M-series signal generating unit 11 generates a M-series signal corresponding to the acquisition data length L=Mp×P−1. The M-series signal is a type of pseudo white signals as stated above.

The signal components at respective time points in the M-series signal are respectively input to the identified object 12, and output data is output from the controlled object (identified object) 12.

A storage unit 15 stores the M-series signal generated in the generating unit 11 and output data obtained from the identified object 12.

An impulse response estimating unit 13 calculates the estimated impulse response value of the controlled object 12 on the basis of the M-series signal and the output data stored in the storage unit 15. This calculation is made using Mathematical Expression (A):

$$\text{Estimated impulse response value } \hat{\theta} = \frac{\left( \sum_{l=0}^{M_p-1} u[Pl] y[Pl] \right)}{\sigma_u^2} \quad (A)$$

Mathematical Expression (A) is the same as Mathematical Expression (17) discussed above. As described above, "u[k]" denotes an M-series signal component acquired at a time point "k" (kth), "y[k]" denotes output data obtained when "u[k]" is input to the identified object 12, and "$\sigma_u^2$" denotes the variance of "u[k]".

A Fourier transform unit 14 identifies the frequency response of the controlled object by performing the discrete Fourier transform of "$\hat{\theta}$".

As has been described heretofore, according to the present embodiment, it is possible to identify the frequency response of a controlled object at a control input-side sampling period by means of high-speed and simple operations in a multiplexed-input multirate system.

Hereinafter, the embodiment will be shown by computer simulation.

First, the discrete-time system transfer function of Mathematical Expression (18) shown below assuming a mechanical system having a plurality of resonance modes is specified as an identified object in computer simulation.

$$P(z) = \frac{\begin{array}{l}-0.009539z^9 + 0.08884z^8 + 0.1452z^7 + 0.3556z^6 + \\ 0.4401z^5 + 0.4295z^4 + 0.3348z^3 + \\ 0.1316z^2 + 0.07566z - 0.005744\end{array}}{\begin{array}{l}z^{10} - 0.4028z^9 + 1.818z^8 - 2.063z^7 + 1.624z^6 - \\ 2.951z^5 + 1.453z^4 - 1.915z^3 + \\ 1.352z^2 - 0.3971z + 0.6743\end{array}} \quad (18)$$

Figure 3:
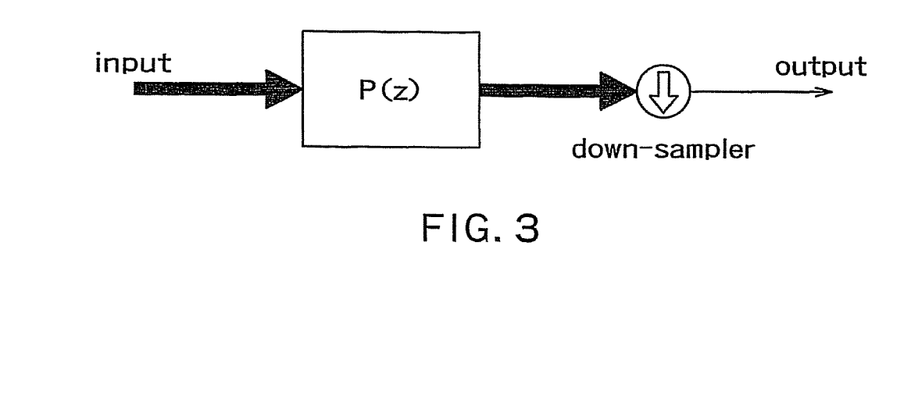
FIG. 3 is a block diagram illustrating an input-output relationship in computer simulation.

The sampling period is specified as 50 [μs]. An M-series signal is input to this identified object at a sampling period of 50 [μs], and output down-sampled at multirate ratio P=2 (sampling period of 100 [μs]) is obtained by computer simulation. FIG. 3 illustrates a block diagram showing the input-output relationship of the identified object at this time. The number of M-series shift register stages is specified as 13 (period Mp=8191). In addition, the length of an impulse response "$\hat{\theta}$" to be estimated using Mathematical Expression (17) is specified as 1024. This corresponds to specifying "n" as n=1023 in Mathematical Expression (8), i.e., setting the expression as $$\theta = [\hat{b}_0 \hat{b}_1 \hat{b}_2 \ldots \hat{b}_{1023}]^T$$

$$u[k] = [u[k]u[k-1]u[k-2]\ldots u[k-1023]]^T \quad (19)$$

Lastly, a 1024-point FFT is performed on an estimated impulse response value "$\hat{\theta}$" obtained by executing Mathematical Expression (17), to obtain the frequency response of the identified object. Here, Mathematical Expression (17) is calculated in the following two cases in order to examine effects to be exerted on identification accuracy by the acquisition data length:

Case 1: when the acquired input/output data length is specified as $$L = M_p P - 1 \quad (20)$$
$$= 8191 \times 2 - 1$$
$$= 16381$$

in accord with Mathematical Expression (15) of the present embodiment: and

Case 2: when the data length is specified as $$L = 13000 \quad (21)$$

i.e., a value set optionally in discord with Mathematical Expression (15).

Figure 4:
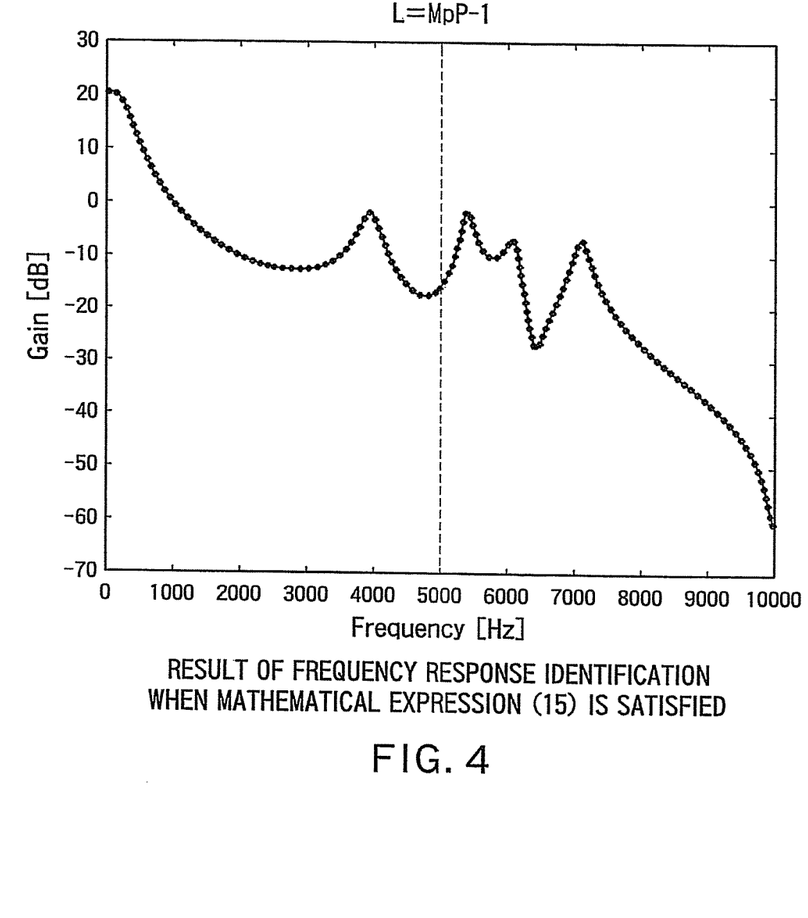
FIG. 4 is a drawing illustrating results of frequency response identification when Mathematical Expression (15) is satisfied.
Figure 5:
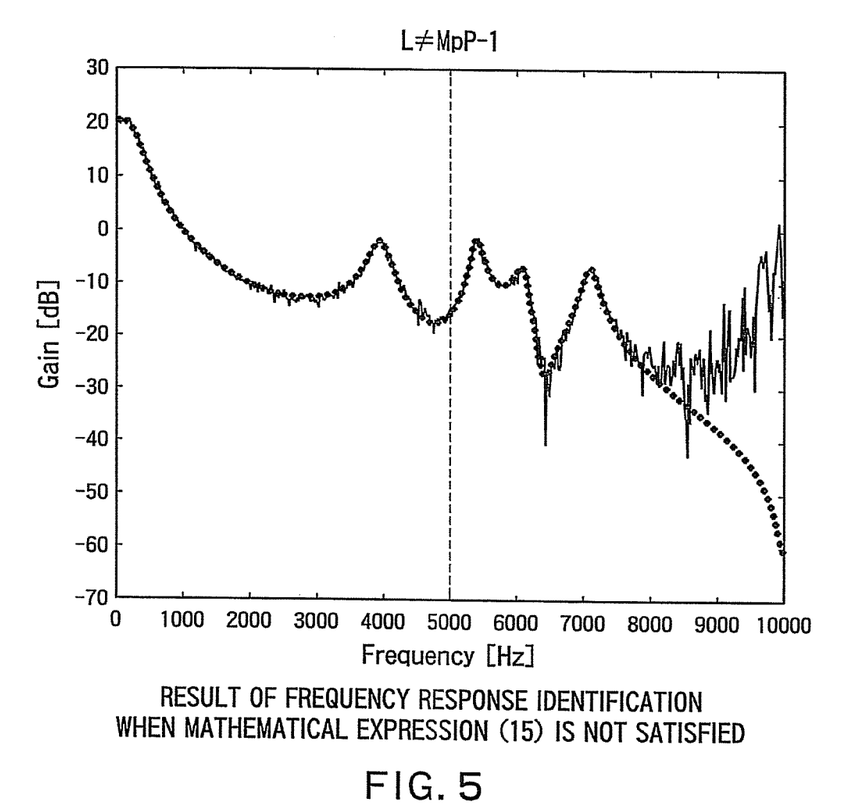
FIG. 5 is a drawing illustrating results of frequency response identification when Mathematical Expression (15) is not satisfied.

FIGS. 4 and 5 illustrate results (frequency responses of the identified object) of computer simulation performed under the above-described settings. In FIGS. 4 and 5, a solid line denotes an identified frequency response, and a dotted line denotes the actual frequency response of the identified object. In addition, a dashed line indicated at 5000 [Hz] in each figure denotes a Nyquist frequency at a sampling period of 100 [μs]. Unlike the identification method of the present embodiment, an identification method that does not explicitly take into consideration characteristics of a multirate system has difficulty in identifying frequency responses at frequencies higher than the Nyquist frequency (right-hand side of the dashed line).

From FIG. 4, it is understood that an identified frequency response agrees well with the actual frequency response when an acquisition data length "L" that satisfies Mathematical Expression (15) of the present embodiment is set. It is also understood that frequency responses can be precisely identified also in a band of frequencies higher than the Nyquist frequency. On the other hand, from FIG. 5, it is understood that when an optional acquisition data length "L" that does not satisfies Mathematical Expression (15) is set, a deviation from the actual frequency response is large, compared with a case in which the data length "L" satisfies Mathematical Expression (15), though rough agreement between frequency responses is observed. Thus, advantageous effects of Mathematical Expressions (15) and (17) of the present embodiment have been verified by the above-described embodiment based on computer simulation.

Note that for a controlled object having a resonance mode higher in frequency than the Nyquist frequency such as a head positioning control system for a magnetic disk device, the frequency responses at a control input-side sampling period available by algorithms of the present embodiment can be used in the design of a multirate notch filter used in order to stabilize the resonance mode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A method of identifying a frequency response of a controlled object at a sampling period of control input in a multiplexed-input multirate system in which a sampling period of control output is even "P" multiples of the sampling period of control input, comprising:
   generating an M-series signal corresponding to an acquisition data length Mp×P−1, the M-series signal being is a type of pseudo white signal and the Mp indicating a period of the M-series signal;
   estimating an impulse response value of the controlled object based on the M-series signal and output data outputted from the controlled object by inputting the M-series signal thereto; and
   performing a discrete Fourier transform on the impulse response value to identify the frequency response of the controlled object.

2. The method according to claim 1, wherein the estimating the impulse response value estimates the impulse response value according to $$\hat{\theta} = \frac{\left(\sum_{l=0}^{M_p-1} u[Pl]y[Pl]\right)}{\sigma_u^2}$$

where "u[k]" is a signal component at a time point "k" in the M-series signal, "y[k]" is the output data of the controlled object when "u[k]" is input thereto, and "$\sigma_u^2$" is a variance of "u[k]".

3. An apparatus which identifies a frequency response of a controlled object at a sampling period of control input in a multiplexed-input multirate system in which a sampling period of control output is even "P" multiples of the sampling period of control input, comprising:
- an M-series signal generating unit configured to generate an M-series signal corresponding to an acquisition data length Mp×P−1, the M-series signal being is a type of pseudo white signal and the Mp indicating a period of the M-series signal;
- an impulse response estimating unit configured to estimate an impulse response value of the controlled object based on the M-series signal and output data outputted from the controlled object by inputting the M-series signal thereto; and
- a frequency response identifying unit configured to perform a discrete Fourier transform on the impulse response value to identify the frequency response of the controlled object.

4. The apparatus according to claim 3, wherein the impulse response estimating unit estimates the impulse response value according to $$\hat{\theta} = \frac{\left(\sum_{l=0}^{M_p-1} u[Pl]y[Pl]\right)}{\sigma_u^2}$$

where "u[k]" is a signal component at a time point "k" in the M-series signal, "y[k]" is the output data of the controlled object when "u[k]" is input thereto, and "$\sigma_u^2$" is a variance of "u[k]".

* * * * *